(12) United States Patent
Kobayashi

(10) Patent No.: US 7,095,700 B2
(45) Date of Patent: Aug. 22, 2006

(54) OPTICAL DISC MEDIUM, OPTICAL DISC RECORDING/REPRODUCING APPARATUS AND METHOD

(75) Inventor: Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 26 days.

(21) Appl. No.: 10/297,928

(22) PCT Filed: Apr. 17, 2002

(86) PCT No.: PCT/JP02/03826

§ 371 (c)(1),
(2), (4) Date: Dec. 9, 2003

(87) PCT Pub. No.: WO02/089122

PCT Pub. Date: Nov. 7, 2002

(65) Prior Publication Data

US 2004/0081068 A1    Apr. 29, 2004

(30) Foreign Application Priority Data

Apr. 24, 2001 (JP) ............................. 2001-126305

(51) Int. Cl.
G11B 7/00 (2006.01)
(52) U.S. Cl. .................. 369/111; 369/124.04
(58) Field of Classification Search ........... 369/109.01, 369/109.02
See application file for complete search history.

(56) References Cited

U.S. PATENT DOCUMENTS 4,674,070 A * 6/1987 Tajima et al. ............ 369/44.37
5,491,683 A   2/1996 Maeda et al. .............. 369/124
5,646,396 A * 7/1997 Richard .................... 250/216
5,657,308 A * 8/1997 Maeda et al. .............. 369/121
5,717,682 A   2/1998 Abraham ................. 369/275.4
5,748,834 A * 5/1998 Miyazaki et al. ............ 386/96

(Continued)

FOREIGN PATENT DOCUMENTS

JP    2000-123364    4/2000

(Continued)

OTHER PUBLICATIONS

Machine translation of JP 2000-123364.*

Primary Examiner—Andrea Wellington
Assistant Examiner—Lixi Chow
(74) Attorney, Agent, or Firm—Oblon, Spivak, McClelland, Maier & Neustadt, P.C.

(57) ABSTRACT

The present invention separates MTF into a plus frequency region and a minus frequency region and uses the plus frequency region and the minus frequency region to thereby enable an effectively usable frequency region to be doubled in effect. Digital information to be recorded on an optical disk medium is recorded as independent signals of, respectively, a light beam reflected or diffracted forward and a light beam reflected or diffracted backward with respect to a direction of traveling of a track on the optical disk medium. At the time of producing an optical disk medium, digital information is divided into two pieces, a complex modulating signal is generated by changing a plus frequency component and a minus frequency component according to the pieces of the divided digital information, and a laser beam is modulated on the basis of the complex modulating signal. At the time of reproducing the optical disk medium, part of the digital information is decoded from a light beam reflected or diffracted forward with respect to a direction of traveling of a track, and another part of the digital information is decoded from a light beam reflected or diffracted backward.

3 Claims, 10 Drawing Sheets

U.S. PATENT DOCUMENTS

| | | | |
|---|---|---|---|
| 6,115,348 A | 9/2000 | Guerra | 369/112 |
| 6,226,257 B1 * | 5/2001 | Morimoto | 369/275.4 |
| 6,507,544 B1 * | 1/2003 | Ma et al. | 369/44.41 |

FOREIGN PATENT DOCUMENTS

| | | |
|---|---|---|
| JP | 2001-076383 | 3/2001 |

* cited by examiner

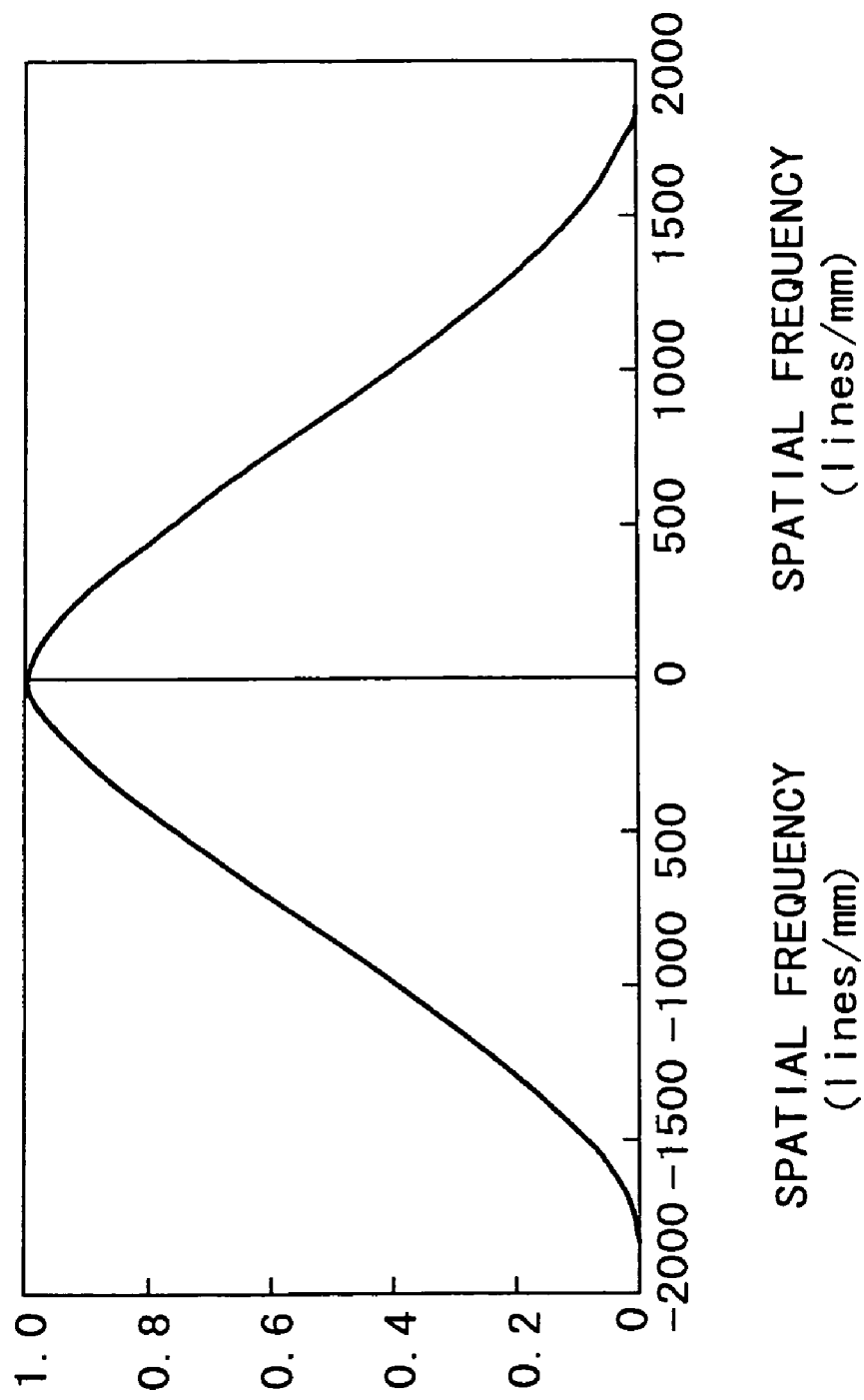

OPTICAL DISC MEDIUM, OPTICAL DISC RECORDING/REPRODUCING APPARATUS AND METHOD

TECHNICAL FIELD

The present invention relates to an optical disk medium such for example as a compact disk (CD), a digital video disk (DVD) or the like, or an apparatus and a method for optical disk recording/reproduction that record and reproduce digital information onto and from an optical disk medium.

BACKGROUND ART

On a conventional optical disk typified by the CD and the DVD, information is recorded by forming optically detectable pits or marks on the medium, and the information is reproduced by detecting the pits or marks by optical means.

The pits or marks recorded on the conventional optical disk are read as an electric signal by an optical pickup, the waveform of the pits or marks is judged to be binary information of 1 or 0 by a judging circuit, and then the result is outputted.

Specifically, a repeated waveform referred to as an "eye pattern" is detected from the optical pickup, and then the waveform is compared with a predetermined threshold value, thereby decoded as binary information and restored to original digital information.

In such a conventional reproducing method, an upper limit of fineness (spatial frequency) of a detectable signal is determined by wavelength of a laser beam and a numerical aperture (NA) of an objective lens used in reproduction.

Specifically, as a recorded signal becomes finer, amplitude of the reproduced signal is decreased, and when an upper limit of spatial frequency is reached, the recorded signal cannot be detected at all. Such change in spatial frequency characteristics is generally referred to as MTF (Modulation Transfer Function).

As an example, FIG. 11 shows MTF characteristics of an optical pickup used for DVD. The axis of ordinates in FIG. 11 indicates amplitude (gain) of a reproduced signal, and the axis of abscissas indicates spatial frequency.

As is clear from FIG. 11, in the case of DVD, detection is possible up to a spatial frequency of about 1700 lines per millimeter.

In the conventional optical disk recording method, an upper limit value of MTF as described above limits fineness recordable on an optical disk. As a result, recording density of an optical disk is fixed.

Hence, optical disk high-density recording proposed thus far raises such a limit of MTF in many cases. Specifically, optical disk high-density recording proposed thus far further shortens the wavelength of a laser or increases the NA.

As a result of these, it is possible to further raise the frequency limit of MTF, and thus increase recording density.

However, the wavelength of a laser has a limit of about 400 nm, and when the wavelength is made shorter than the limit, the light does not pass through a plastic substrate.

In addition, increasing the NA requires reducing a space between a surface of the optical disk and the objective lens. Data reading therefore becomes unreliable when there is dust on the surface of the disk or the like.

Multilevel recording has also been proposed which records information as multilevel information rather than as a binary value of 1 or 0.

In Japanese Patent Laid-Open No. Sho 61-94244, for example, an increase in recording capacity is made possible by irradiating an identical spot on a recording medium having a recording layer in which a hole is formed by light irradiation with a varied number of beams according to information contents, thus forming holes of different depths and thereby recording multilevel information.

That is, the invention realizes multilevel recording by changing the number of beam spots applied to the same spot and thereby changing the depth of the hole stepwise.

An information recording apparatus disclosed in Japanese Patent Laid-Open No. Hei 2-31329 modulates power of a light beam to a plurality of levels, phase-changes a phase change recording medium to a plurality of stages, and thus records information as a multistage, or multilevel signal.

In Japanese Patent Laid-Open No. Hei 4-38088, multilevel information is recorded by changing a coordination environment in a metallic-complex. When an octahedral coordination is used as a typical example, the invention enables multilevel recording of up to six levels using up to six changes.

However, when multilevel recording (multistage recording) as described above is applied, a signal-to-noise ratio (SNR) of a medium needs to be improved.

In addition, a direct-current component of a recording signal cannot be eliminated in multilevel recording. Therefore, it is known that when overall level of a reproduced signal is raised or lowered, the signal is decoded into information different from the original information and thus error rate is drastically deteriorated.

The MTF shown in FIG. 11 has the axis of abscissas as frequency. Frequency used in handling an electric signal assumes a plus value at all times.

However, as for optical resolution, there are a plus spatial frequency and a minus spatial frequency. Specifically, as shown in FIG. 12, not only a plus spatial frequency region but also a minus spatial frequency region is actually present. Describing the plus and minus spatial frequency regions as light diffraction, the plus and minus spatial frequency regions correspond to light diffracted forward and light diffracted backward with respect to rotation of a disk.

It is accordingly an object of the present invention to provide an optical disk medium and an apparatus and a method for optical disk recording/reproduction that separate the MTF shown in FIG. 11 into a plus frequency region and a minus frequency region and use the plus frequency region and the minus frequency region to enable an effectively usable frequency region to be doubled in effect and thus enable recording density to be increased.

That is, the present invention can increase the density without the need for an increased NA of an objective lens and a shorter wavelength and without substantially changing an optical pickup and optical disk manufacturing technology currently in use. Also, the present invention enables high-density recording at a lower SNR as compared with multilevel recording.

DISCLOSURE OF THE INVENTION

In order to achieve the above object, according to the present invention, there is provided an optical disk medium having digital information recorded so as to form a concentric or spiral track, the optical disk medium characterized in that the digital information is recorded as independent signals of, respectively, a light beam reflected or diffracted forward with respect to a direction of traveling of the track and a light beam reflected or diffracted backward with respect to the direction of traveling of the track.

Therefore, the optical disk medium expands an effective frequency region to enable higher-density recording than conventional. It is thus possible to realize a medium of higher recording density without the need for an increased NA of the objective lens and a shorter wavelength.

Further, according to the present invention, there is provided an optical disk reproduction apparatus for reading digital information recorded on an optical disk medium having a concentric or spiral track formed thereon by condensing a laser beam on the optical disk medium by optical means and thus irradiating the optical disk medium with the laser beam as a reproduction light spot and by detecting the laser beam obtained as a result of the reproduction light spot being reflected or diffracted by the optical disk medium, the optical disk reproduction apparatus characterized by comprising: first decoding means for decoding a part of the digital information from a light beam reflected or diffracted forward with respect to a direction of traveling of the track; and second decoding means for decoding a part of the digital information from a light beam reflected or diffracted backward with respect to the direction of traveling of the track.

Therefore, the optical disk reproduction apparatus can reproduce a disk on which high-density recording is performed by expanding an effective frequency region into a plus and a minus frequency region. It is thus possible to realize reproduction of a medium on which high-density recording is performed without the need for an increased NA of the objective lens and a shorter wavelength.

Further, according to the present invention, there is provided an optical disk reproduction method for reading digital information recorded on an optical disk medium having a concentric or spiral track formed thereon by condensing a laser beam on the optical disk medium by optical means and thus irradiating the optical disk medium with the laser beam as a reproduction light spot and by detecting the laser beam obtained as a result of the reproduction light spot being reflected or diffracted by the optical disk medium, the optical disk reproduction method characterized by comprising the steps of: decoding a part of the digital information from a light beam reflected or diffracted forward with respect to a direction of traveling of the track; and decoding another part of the digital information from a light beam reflected or diffracted backward with respect to the direction of traveling of the track.

Therefore, the optical disk reproduction method can reproduce a disk on which high-density recording is performed by expanding an effective frequency region into a plus and a minus frequency region. It is thus possible to realize reproduction of a medium on which high-density recording is performed without the need for an increased NA of the objective lens and a shorter wavelength.

Further, according to the present invention, there is provided an optical disk recording apparatus for condensing a laser beam on a disk-shaped optical disk medium by optical means and thus irradiating the optical disk medium with the laser beam, and thereby recording digital information on a concentric or spiral track, the optical disk recording apparatus characterized by comprising: complex modulating means for generating a complex modulating signal obtained by separating the digital information into a plus frequency component and a minus frequency component; and laser modulating means for modulating the laser beam on the basis of the complex modulating signal.

Therefore, the optical disk recording apparatus can in effect expand a frequency region by using the plus and minus frequency regions independently, and thus provide an optical disk allowing high-density recording and reproduction. It is thereby possible to realize much higher recording density than conventional without the need for an increased NA of the objective lens and a shorter wavelength.

Further, according to the present invention, there is provided an optical disk recording method for condensing a laser beam on a disk-shaped optical disk medium by optical means and thus irradiating the optical disk medium with the laser beam, and thereby recording digital information on a concentric or spiral track, the optical disk recording method characterized by comprising the steps of: dividing the digital information into at least two pieces; generating a complex modulating signal by changing a plus frequency component and a minus frequency component according to the pieces of the divided digital information; and recording the digital information on the optical disk medium by modulating the laser beam on the basis of the complex modulating signal.

Therefore, the optical disk recording method can in effect expand a frequency region by using the plus and minus frequency regions independently, and thus provide an optical disk allowing high-density recording and reproduction. It is thereby possible to realize much higher recording density than conventional without the need for an increased NA of the objective lens and a shorter wavelength.

BRIEF DESCRIPTION OF THE DRAWINGS

FIG. 12 is a diagram of assistance in explaining an example of optical spatial frequency characteristics (MTF).

BEST MODE FOR CARRYING OUT THE INVENTION

Embodiments of an optical disk medium and an apparatus and a method for optical disk recording/reproduction according to the present invention will hereinafter be described.

It is to be noted that while the embodiments to be described below are preferred concrete examples of the present invention and a variety of technically preferable limitations are set, the scope of the present invention is not limited to these modes in the description below unless there is a description to the effect that the present invention is specifically limited.

Figure 1:
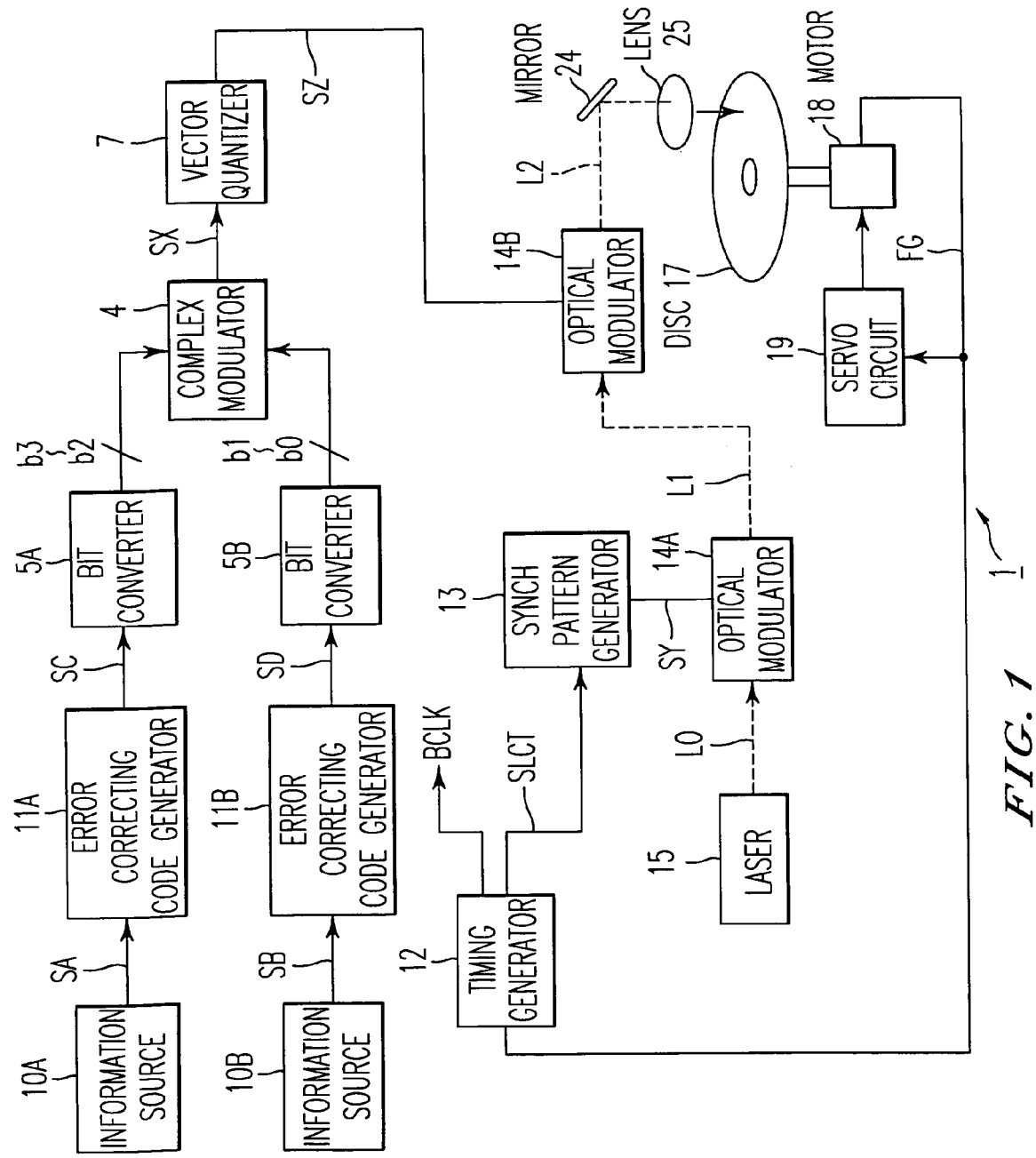
FIG. 1 is a block diagram showing a general configuration of an optical disk recording apparatus for producing an optical disk according to an embodiment of the present invention.

FIG. 1 is a block diagram showing an optical disk recording apparatus 1 according to an embodiment of the present invention.

The optical disk recording apparatus 1 exposes a disk master 17 to light and thereby records digital data SA outputted from an information source 10A, and at the same time, records digital data SB outputted from an information source 10B onto the same disk master 17.

At this time, the digital data SA is recorded mainly using a plus frequency domain, and the digital data SB is recorded mainly using a minus frequency domain.

Thus, the present embodiment realizes a higher recording density than is conventional by using independently the plus and minus frequency domains, which have not been distinguished from each other conventionally.

In an optical disk manufacturing process, the disk master 17 on which the information from the information sources 10A and 10B is thus recorded is developed. Next, the developed disk master 17 is subjected to an electroforming process to form a mother disk, and then a stamper is produced from the mother disk.

Further, in the optical disk manufacturing process, a disk-shaped substrate is produced from the thus produced stamper, and a reflective film and a protective film are formed on the disk-shaped substrate, whereby an optical disk medium shown in FIG. 2 (hereinafter referred to simply as an optical disk) 2 is produced.

Components of the optical disk recording apparatus 1 will next be described.

A spindle motor 18 in the optical disk recording apparatus 1 rotation-drives the disk master 17, and outputs an FG signal having a signal level rising at each predetermined angle of rotation from an FG signal generating circuit held at a bottom portion thereof.

A spindle servo circuit 19 drives the spindle motor 18 such that frequency of the FG signal becomes a predetermined frequency according to a position of exposure of the disk master 17, whereby the disk master 17 is rotation-driven at a predetermined rotational speed.

A recording laser 15 is formed by a gas laser or the like, and emits a laser beam L0 for exposure of the disk master. An optical modulator 14A is an AOM (Accousto Optic Modulator) formed by an electric acoustooptic element or the like. The optical modulator 14A turns on and off the laser beam L0 according to a synchronizing signal SY outputted from a synchronizing pattern generating circuit 13, and thereby embeds a synchronizing pattern.

A laser beam L1 in which the synchronizing pattern is thus inserted is inputted to an optical modulator 14B. As with the optical modulator 14A, the optical modulator 14B is formed by an AOM. The optical modulator 14B modulates intensity of the laser beam L1 according to an intensity modulating signal SZ, and outputs the result as a laser beam L2.

An optical path of the laser beam L2 thus obtained is bent by a mirror 24. The laser beam L2 then travels toward the disk master 17 and is condensed on the disk master 17 by an objective lens 25.

The mirror 24 and the objective lens 25 are sequentially moved by a sled mechanism not shown in the figure in a direction of an outer circumference of the disk master 17 in synchronism with the rotation of the disk master 17. The mirror 24 and the objective lens 25 thereby sequentially shift the position of exposure of the disk master 17 to the laser beam L2 in the direction of the outer circumference of the disk master 17.

With the configuration described above, the optical disk recording apparatus 1 forms a pit train and a groove in a spiral manner by moving the mirror 24 and the objective lens 25 in a state of the disk master 17 being rotation-driven. As the pit train, the synchronizing signal SY is recorded. For the groove, exposure to light at a laser power according to the intensity modulating signal SZ is performed.

As a result, the groove is recorded on the disk master 17, and depth of the groove is changed according to intensity of the laser light L2. Also, a synchronizing pattern is periodically inserted as the pit train.

Figure 2:
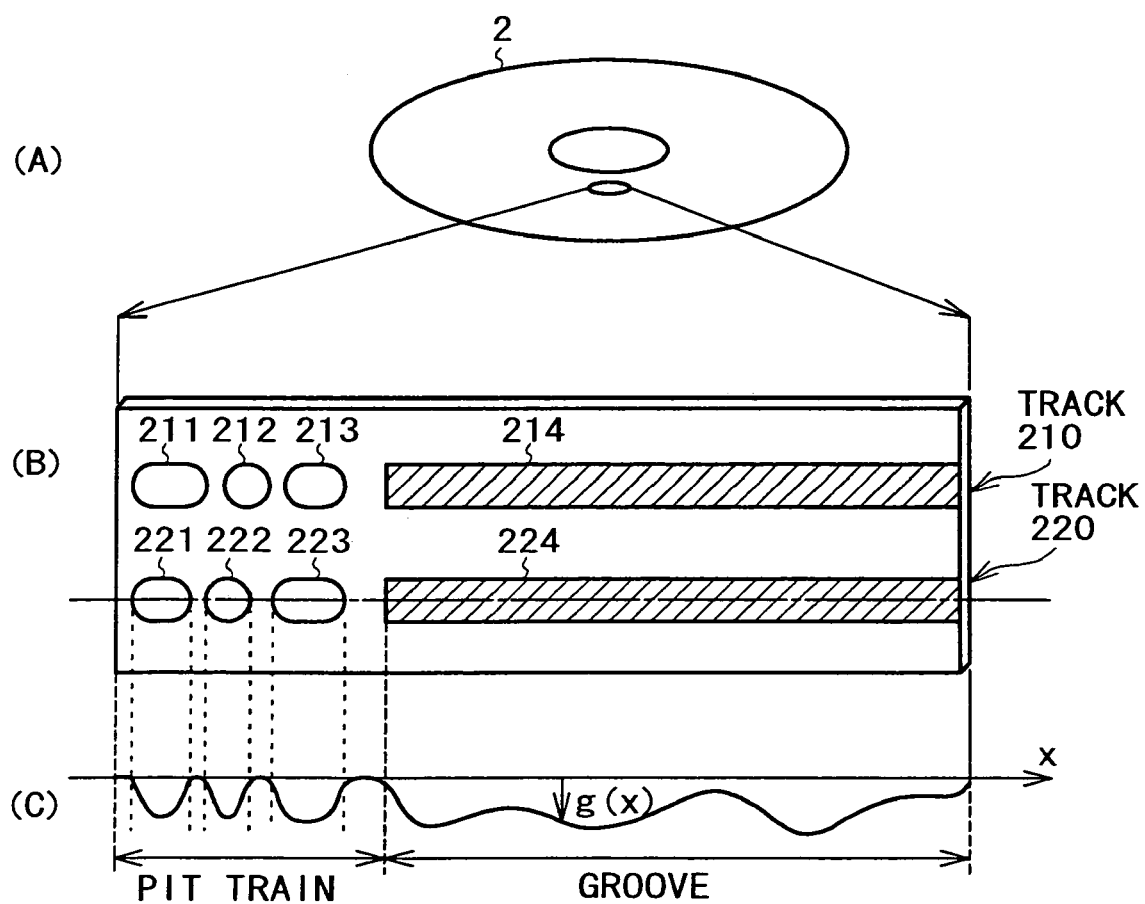
FIG. 2 is a schematic diagram of assistance in explaining an optical disk according to an embodiment of the present invention and a state of a signal recording surface of the optical disk.

FIG. 2 is a schematic diagram of assistance in explaining a state of a thus produced optical disk 2 according to the present embodiment.

FIG. 2(A) shows the whole of the optical disk 2 having tracks formed spirally or concentrically on a signal recording surface thereof. FIG. 2(B) shows in enlarged dimension part of two of the tracks.

As shown in FIG. 2(B), synchronizing patterns are recorded as pit trains 211, 212, 213, 221, 222, and 223 by the synchronizing signal SY on the optical disk 2 in this example. These pit trains are used for detection of synchronization, reading of address information, clock reproduction to be described later and the like.

The digital data SA and the digital data SB recorded on a track 210 are recorded as change in depth of a groove 214.

Similarly, the digital data SA and the digital data SB recorded on a track 220 are recorded as change in depth of a groove 224.

In order to explain this state, FIG. 2(C) schematically shows sectional shape of the track 220. As shown in FIG. 2(C), in a region of the groove 224 on the track 220, a groove of uniform width is formed, and depth of the groove is changed according to $g(x)$, whereby both the digital data SA and the digital data SB are recorded.

The groove depth $g(x)$ changes according to intensity of the laser applied to the disk master 17. That is, the groove depth $g(x)$ changes according to the intensity modulating signal SZ.

As described above, in the present embodiment, the modulating signal is recorded as change in the depth of a groove. Therefore, conventional mastering and stamping apparatus can be used substantially as they are for higher-density recording.

In FIG. 1, an error correcting code generating circuit 11A receives the digital data SA outputted from the information source 10A, and adds error correcting code thereto. The error correcting code generating circuit 11A then subjects the digital data SB to interleaving processing, and outputs the result as an 8-bit digital signal SC.

Similarly, an error correcting code generating circuit 11B receives the digital data SB outputted from the information source 10B, and adds error correcting code thereto. The error correcting code generating circuit 11B then subjects the digital data SA to interleaving processing, and outputs the result as an 8-bit digital signal SD.

By thus adding the error correcting code to the two information sources to be superimposed on each other for recording, it is possible to read correct information even if a defect should occur on the disk.

A timing generator 12 generates various time reference signals for controlling timing of the whole of the optical disk recording apparatus 1 in synchronism with the FG signal, and then supplies the signals to parts of the apparatus.

Incidentally, to show all of these signals will complicate the figure, and hence only a BCLK and an SLCT signals are shown in FIG. 1.

The BCLK signal is a clock signal that changes from a logical 0 to 1 each time a digital signal is outputted from number of bits converting circuits 5A and 5B.

By detecting a change in the BCLK signal, it is possible to detect input of new data to a complex modulating circuit 4.

The SLCT signal is a signal that changes from a logical 0 to 1 each time data for a predetermined time is recorded on the disk master 17 in synchronism with the rotation of the disk master 17.

According to change in the SLCT signal, the optical modulator 14A subjects the laser light L0 to on-off modulation by the synchronizing signal SY obtained periodically from the synchronizing pattern generating circuit 13, and then outputs the result as the laser light L1.

The synchronizing pattern generating circuit 13 generates a pattern for synchronization required at the time of reproduction, address information, servo information required for access and the like.

Such a synchronizing pattern is periodically inserted in synchronism with the rotation of the disk master 17. Consequently, synchronization of a reproduced signal can be obtained from the produced disk by a simple method, and information of a target track can be obtained by using the address information or the like.

The number of bits converting circuit 5A converts a unit number of bits of the 8-bit digital data SC supplied from the error correcting code generating circuit 11A, and then supplies the result as 2-bit data b3 and b2 to the complex modulating circuit 4.

The number of bits converting circuit 5B is configured in exactly the same manner as the number of bits converting circuit 5A. The number of bits converting circuit 5B converts the digital information SD in units of 8 bits obtained from the error correcting code generating circuit 11B into bit data b0 and b1 in units of 2 bits, and then outputs the bit data b0 and b1.

The complex modulating circuit 4 generates a complex modulating signal SX according to the bit data b0, b1, . . . , and b3.

The complex modulating signal SX comprises a real part signal (SXr) and an imaginary part signal (SXi). However, it is not possible to directly record information of such a complex number on the optical disk.

Accordingly, in this example, a vector quantization circuit 7 extracts phase information from the complex modulating signal SX, and thereby converts the complex modulating signal SX into the intensity modulating signal SZ without an imaginary part.

The optical modulator 14B modulates the intensity of the laser light L1 according to the intensity modulating signal SZ, and records the result as the laser light L2 on the disk master 17.

That is, the depth g(x) of the groove formed is changed according to change in the laser light L2, whereby the digital data SA and the digital data SB are recorded.

Figure 3:
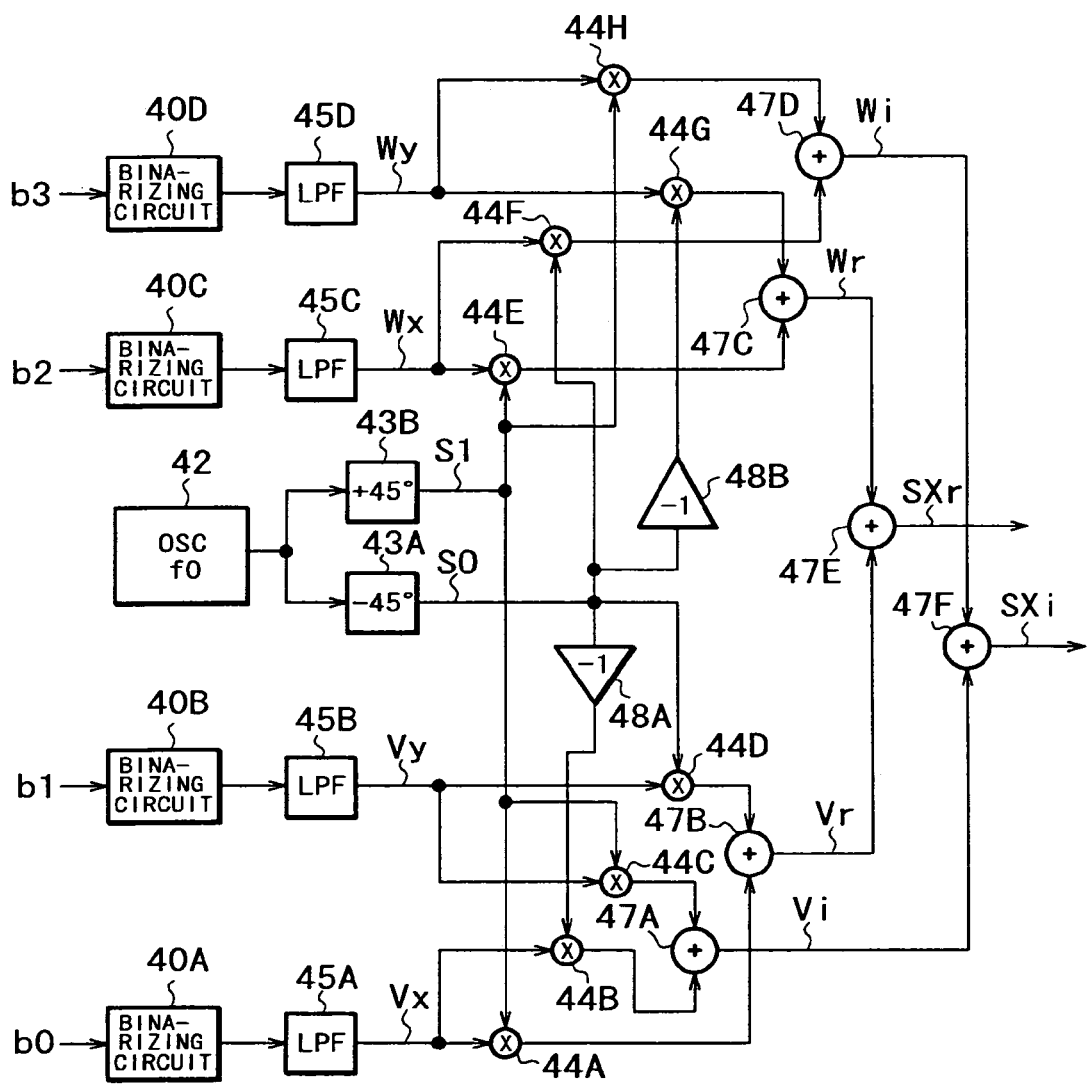
FIG. 3 is a block diagram showing an example of configuration of a complex modulating circuit in the optical disk recording apparatus shown in FIG. 1.

FIG. 3 is a block diagram showing a configuration of the complex modulating circuit 4.

In the figure, in a predetermined time interval T, the digital signals b0, b1, . . . , and b3 inputted to the complex modulating circuit 4 are inputted to binarizing circuits 40A to 40B to be converted into binary signals having signal levels (+1, −1). Next, low-pass filters 45A to 45D are applied to provide band-limited binary wave signals (Vx, Vy, Wx, and Wy) whose band is limited to a predetermined frequency band Fb.

In this case, characteristics of the low-pass filters 45A to 45D are selected so as not to add intersymbol interference. As such low-pass filter characteristics, Raised Cosin characteristics, for example, are known.

Figure 4A:
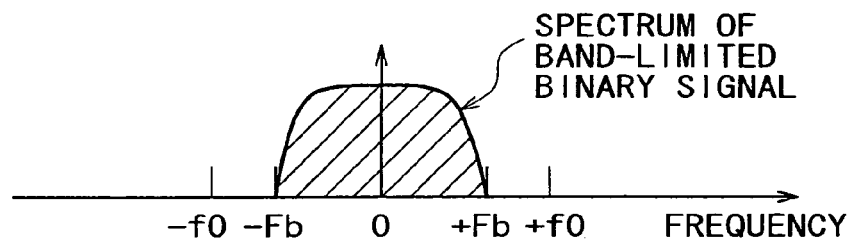
FIGS. 4A, 4B, 4C, and 4D are schematic diagrams of assistance in explaining signal spectra in the complex modulating circuit shown in FIG. 3.

FIG. 4A schematically shows a spectrum of such band-limited binary wave signals (Vx, Vy, Wx, and Wy). As is clear from FIG. 4A, the band-limited binary wave signals (Vx, Vy, Wx, and Wy) are band-limited so as to fall within a frequency region (−Fb to +Fb).

A carrier generating circuit 42 in FIG. 3 is formed by a crystal oscillator circuit or the like. The carrier generating circuit 42 generates a carrier signal of a frequency f0, and then supplies the carrier signal to a +45° phase shifting circuit 43B and a −45° phase shifting circuit 43A.

A carrier signal S1 obtained from the +45° phase shifting circuit 43B and a carrier signal S0 obtained from the −45° phase shifting circuit 43A are expressed by the following equations (1) and (2):

$$S1 = A \cdot \cos(2\pi f0 \cdot t) \quad (1)$$

$$S0 = A \cdot \sin(2\pi f0 \cdot t) \quad (2)$$

where A represents a constant, and t represents time.

The oscillation frequency f0 of the carrier generating circuit 42 is set so as to satisfy the following equation (3):

$$f0 > Fb \quad (3)$$

The carrier signal S1 obtained from the +45° phase shifting circuit 43B and the carrier signal S0 obtained from the −45° phase shifting circuit 43A are inputted to multiplier circuits 44A to 44H.

The multiplier circuits 44A to 44H each calculate a product of the carrier signal S1 or S0 and the band-limited binary wave signal (Vx, Vy, Wx, or Wy), and then output the result.

Polarity reversing circuits 48A and 48B reverse polarity of the output of the phase shifting circuit 43A, and then supply the result to the multiplier circuits 44B and 44G, respectively.

Outputs of the multiplier circuits 44A to 44H are added together by adder circuits 47A to 47F.

As a result of the above, an output (Vi) of the adder circuit 47A and an output (Vr) of the adder circuit 47B are signals as expressed by the following equations (4) and (5):

$$Vi = -A \cdot Vx \cdot \sin(2\pi \cdot f0 \cdot t) + A \cdot Vy \cdot \cos(2\pi \cdot f0 \cdot t) \quad (4)$$

$$Vr = A \cdot Vx \cdot \cos(2\pi \cdot f0 \cdot t) + A \cdot Vy \cdot \sin(2\pi \cdot f0 \cdot t) \quad (5)$$

Considering a complex number V having the two signals (Vr and Vi) as a real part and an imaginary part thereof, the equations (4) and (5) can be rewritten by complex expression as the following equation (6):

$$V = A \cdot Vx \cdot \operatorname{Exp}(-j \cdot 2\pi \cdot f0 \cdot t) + A \cdot jVy \cdot \operatorname{Exp}(-j \cdot 2\pi \cdot f0 \cdot t) \quad (6)$$

where j represents an imaginary number.

The equation (6) indicates that the complex signal V is obtained as a result of a frequency shift of frequency components of Vx and Vy by −f0.

Figure 4B:
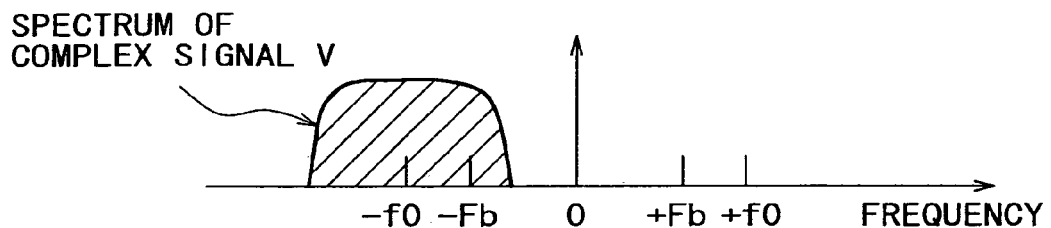

FIG. 4B schematically shows a spectrum of such a complex signal V. As is clear from FIG. 4B, the complex signal V is present only in a frequency region on the minus side.

Similarly, an output (Wr) of the adder circuit 47C and an output (Wi) of the adder circuit 47D are signals as expressed by the following equations (7) and (8):

$$Wi = A \cdot Wx \cdot \sin(2\pi \cdot f0 \cdot t) + A \cdot Wy \cdot \cos(2\pi \cdot f0 \cdot t) \quad (7)$$

$$Wr = A \cdot Wx \cdot \cos(2\pi \cdot f0 \cdot t) - A \cdot Wy \cdot \sin(2\pi \cdot f0 \cdot t) \quad (8)$$

Considering a complex number W having the two signals (Wr and Wi) as a real part and an imaginary part thereof, respectively, the equations (7) and (8) can be rewritten by complex expression as the following equation (9):

$$W = A \cdot Wx \cdot \operatorname{Exp}(+j \cdot 2\pi \cdot f0 \cdot t) + A \cdot jWy \cdot \operatorname{Exp}(+j \cdot 2\pi \cdot f0 \cdot t) \quad (9)$$

Figure 4C:
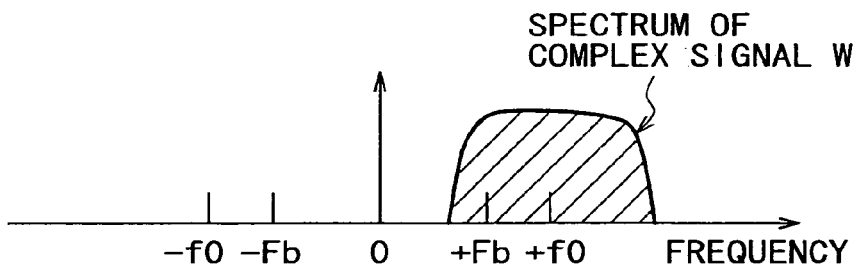

The equation (9) indicates that the complex signal W is obtained as a result of a frequency shift of frequency components of Wx and Wy by +f0. FIG. 4C schematically shows a spectrum of such a complex signal W. As is clear from FIG. 4C, the complex signal W is present only in a frequency region on the plus side.

Next, the adder circuit 47E adds the output (Wr) of the adder circuit 47C and the output (Vr) of the adder circuit 47B to each other, and then outputs the result. That is, the adder circuit 47E adds the real parts of the complex signal W and the complex signal V to each other, and then outputs the result as SXr.

Similarly, the adder circuit 47F adds the output (Wi) of the adder circuit 47D and the output (Vi) of the adder circuit 47A to each other, and then outputs the result. That is, the adder circuit 47F adds the imaginary parts of the complex signal W and the complex signal V to each other, and then outputs the result as SXi.

Considering a complex modulating signal SX having (SXr and SXi) as a real part and an imaginary part thereof, respectively, the complex modulating signal SX is expressed by the following equation (10):

$$SX = W + V \quad (10)$$

Figure 4D:
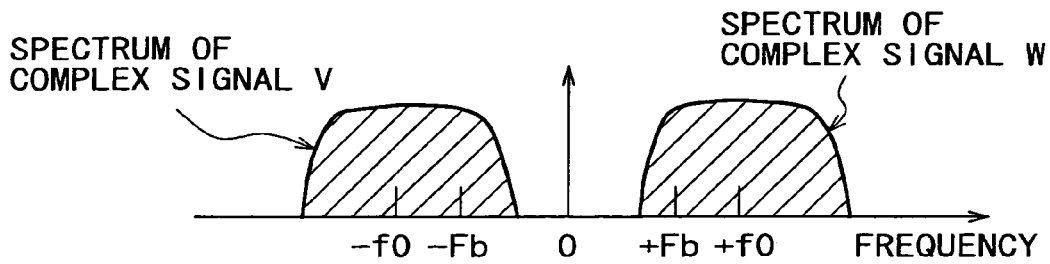

FIG. 4D schematically shows a spectrum of such a complex modulating signal SX. As is clear from FIG. 4D, the complex modulating signal SX has frequency components on both the plus side and the minus side. The 2-bit digital signals (b3 and b2) are recorded in a frequency region on the plus side, and the 2-bit digital signals (b1 and b0) are recorded in a frequency region on the minus side.

By thus using the separate frequency regions on the plus side and the minus side, the present embodiment realizes a higher recording density than conventional.

However, the complex modulating signal SX cannot be recorded as it is on the optical disk. Accordingly, in this example, the vector quantization circuit 7 is used to simplify and convert the complex modulating signal SX into the intensity modulating signal SZ, and then the intensity modulating signal SZ is recorded on the optical disk master 17.

Figure 5:
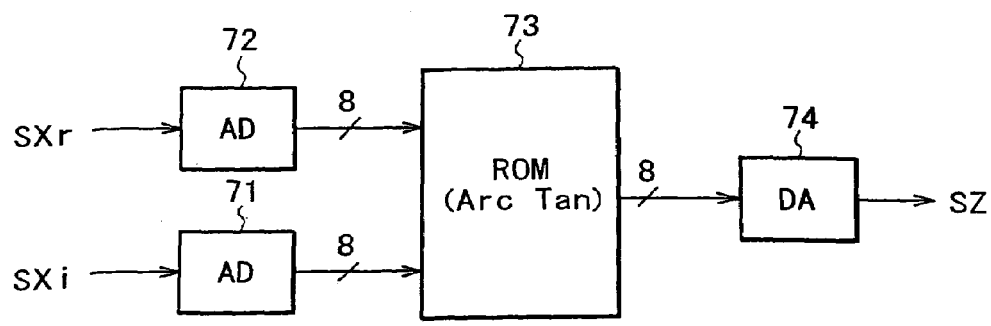
FIG. 5 is a block diagram showing a simple example of configuration of a vector quantization circuit in the optical disk recording apparatus shown in FIG. 1.

FIG. 5 is a block diagram showing an example of the simplest configuration of the vector quantization circuit 7. In the figure, the components (SXr and SXi) of the complex modulating signal SX are inputted to 8-bit AD converters 71 and 72.

The bit AD converter 71 converts the inputted signal into an 8-bit digital value, and then outputs the 8-bit digital value as address information for a read-only memory (ROM) 73. Calculation data as represented by the following equation (11) is prerecorded within the read-only memory 73.

$$SZ = 128 \cdot \arctan(SXi/SXr) \div \pi + 128 \quad (11)$$

where arctan represents an arc tangent function.

Specifically, the calculation of the equation (11) detects an angular component of the complex modulating signal SX, and then outputs the angular component of the complex modulating signal SX as an integer on a scale of 256. Since the complex modulating signal SX is thus simplified into only the angular component, when the optical disk in this example is reproduced, noise is observed to be somewhat increased. However, the noise can be controlled to a level that does not present a problem in restoring recorded information.

Various algorithms have already been developed for vector quantization. When the noise can be further reduced by applying such an algorithm, it further stabilizes reproduction, and is therefore more preferable.

In addition, when 256-level quantization is too much, it is theoretically possible to reduce the quantization to three levels.

An 8-bit digital signal obtained from the read-only memory 73 is next converted into an analog voltage by a DA converter 74, and then supplied as the intensity modulating signal SZ to the optical modulator 14B.

The intensity modulating signal SZ thus obtained from the vector quantization circuit 7 is converted into change in the intensity of the laser beam L2 by the optical modulator 14B in FIG. 1, and then recorded as the groove depth g(x) cut into the disk master 17.

At this time, the laser power is controlled such that a relation as expressed by the following equation (12) is maintained between the groove depth g(x) and the intensity modulating signal SZ.

$$g(x) = K \cdot SZ \quad (12)$$

where a value of K is set as expressed by the following equation (13):

$$K = \lambda \div (n \cdot 256) \quad (13)$$

where λ is wavelength of a laser used in reading, and n is an index of refraction of a completed optical disk.

By satisfying the equations (12) and (13), phase change corresponding to a phase angle of the complex modulating signal SX is given to laser light used in reading.

As a result of the above, both the digital data SA and the digital data SB are recorded as change in the groove depth on the disk master 17. The digital data SA is recorded in the minus frequency region, whereas the digital data SB is recorded in the plus frequency region.

The disk master 17 on which exposure recording is thus performed is developed, so that the portion of the groove appears as a concave pattern. Further, the disk master 17 is subjected to an electroforming process to form a mother disk.

A stamper is formed by using the mother disk. Injection molding is repeated on the basis of the stamper, whereby mass-replicated optical disks 2 can be obtained.

Figure 6:
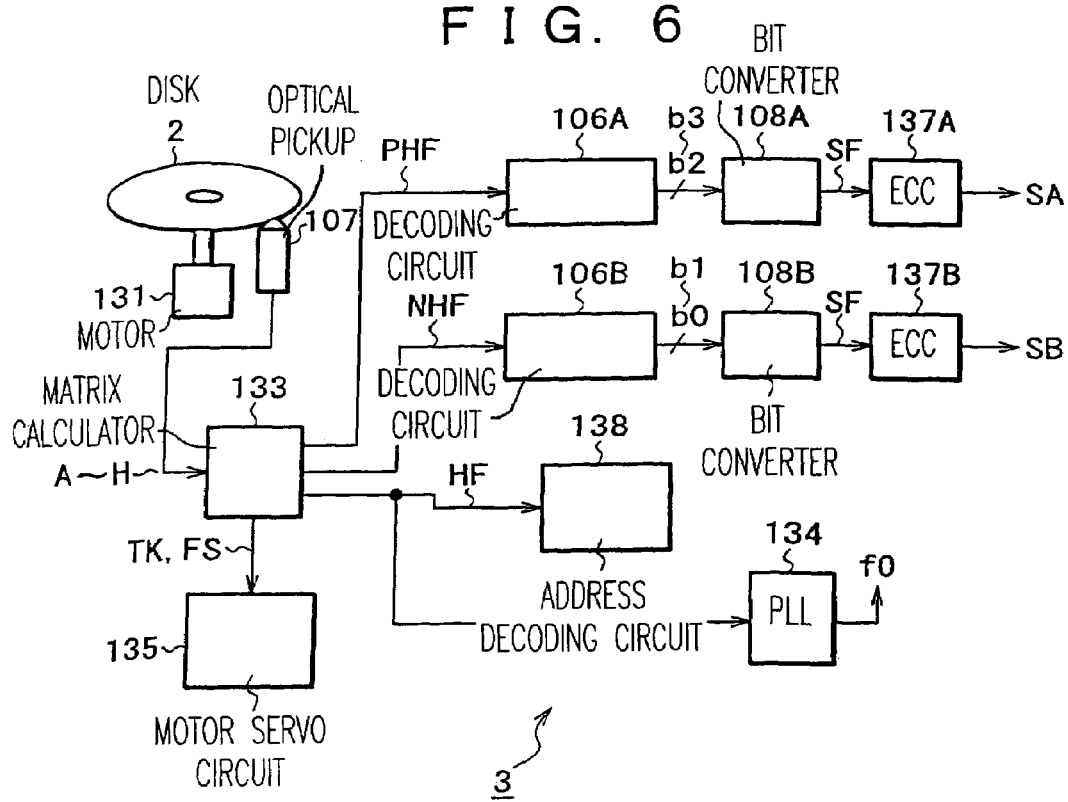
FIG. 6 is a block diagram showing a general configuration of an optical disk reproduction apparatus for reproducing an optical disk according to an embodiment of the present invention.

FIG. 6 is a block diagram showing a configuration of an optical disk reproduction apparatus according to the present embodiment.

An optical disk reproduction apparatus 3 for reproducing an optical disk 2 on which two pieces of digital information as described above are recorded as change in groove depth will be described in the following with reference to FIG. 6.

The optical disk 2 in FIG. 6 is rotated by a spindle motor 131. The spindle motor 131 is controlled by a servo circuit 135 so as to rotate at predetermined rotational speed.

An optical pickup 107 is also controlled by the servo circuit 135 so as to perform predetermined operations such as focusing, tracking and the like.

Figure 7:
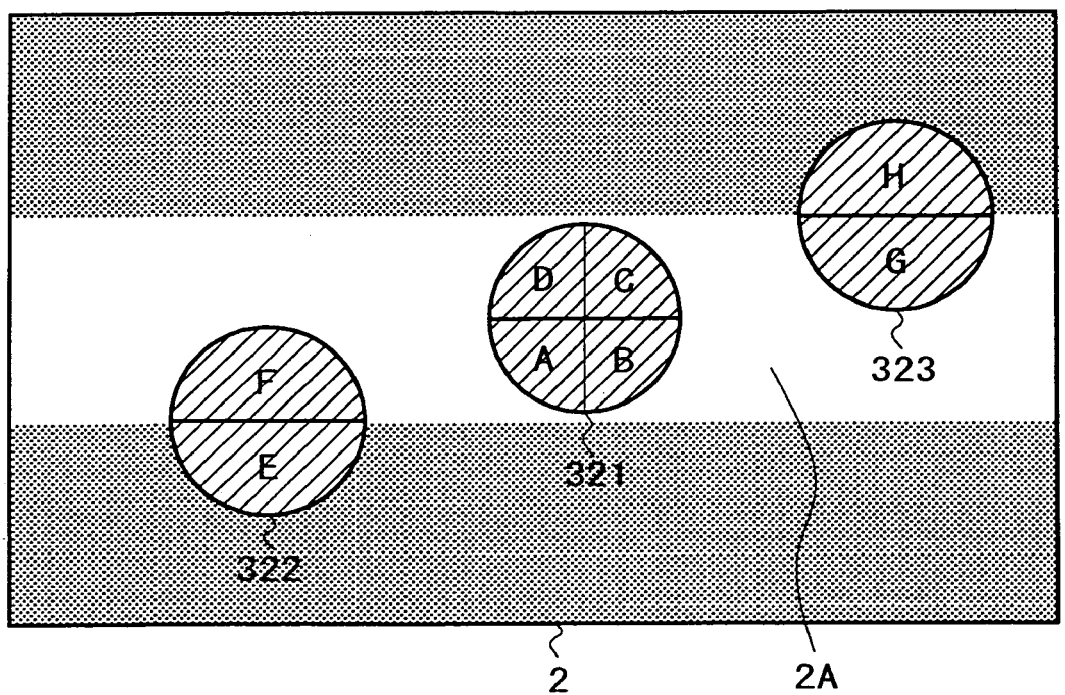
FIG. 7 is a diagram of assistance in explaining a relative position of light spots formed by an optical pickup of the optical disk reproduction apparatus shown in FIG. 6, a groove recorded on an optical disk, and detectors.

A laser beam emitted from the optical pickup 107 is divided into three spots (spots 321 to 323) by a diffraction grating within the optical pickup 107. The spots are applied to the optical disk 2, and then return to the optical pickup 107. FIG. 7 schematically shows this state.

Part of the beam reflected by the optical disk 2 is outputted as detection signals A to H by a plurality of detectors within the optical pickup 107. The detection signals A to H are inputted to a matrix calculator circuit 133.

The matrix calculator circuit 133 is formed by an operational amplifier or the like. The matrix calculator circuit 133 calculates signals-such as an HF signal, a track error signal TK, a focus error signal FS, a plus frequency signal PHF, and a minus frequency signal NHF from the detection signals A to H.

FIG. 7 shows a relative position of the three light spots (spots 321 to 323) when tracking is performed and a groove 2A recorded in the optical disk 2. Four divided detectors (A, B, C, and D) disposed in a far field are assigned for the center spot 321. A beam obtained from the spot 321 is divided into four pieces, which are then detected by their respective detectors.

For the spot 322, the signals E and F are detected by two divided detectors. Similarly, for the spot 323, the signals G and H are detected by two divided detectors.

The E signal and F signal obtained from the spot 322 and the G signal and H signal obtained from the spot 323 are inputted to the matrix calculator circuit 133. The matrix calculator circuit 133 obtains a track error signal TK by performing an operation of the following equation (14) on the four signals (E, F, G, and H).

$$TK\ signal=(E-F)+(H-G) \qquad (14)$$

Also, the matrix calculator circuit 133 performs operations of the following equations (15), (16), (17), and (18) on four outputs (A, B, C, and D) from the four divided detectors that have detected the spot 321.

$$HF\ signal=A+B+C+D \qquad (15)$$

$$FS\ signal=A-B+C-D \qquad (16)$$

$$PHF\ signal=A+D \qquad (17)$$

$$NHF\ signal=B+C \qquad (18)$$

The FS signal is a focus error signal, and is used to focus an objective lens disposed within the optical pickup 107. Hence, the FS signal is supplied to the servo circuit 135 to effect control so that a beam applied through the objective lens within the optical pickup 107 is focused on the optical disk 2 at all times.

The HF signal retains information recorded as pits. Hence, the HF signal is supplied to an address decoding circuit 138, and is used to detect address information and the like that are periodically embedded as a synchronizing signal SY.

The HF signal is also supplied to a PLL circuit 134. The PLL circuit 134 is formed by a phase-locked loop circuit. The PLL circuit 134 restores timing information such as a carrier signal f0 or the like from the signal periodically embedded as the synchronizing signal SY, and then supplies the carrier signal f0 or the like to decoding circuits 106A and 106B.

The plus frequency signal PHF is mainly a signal diffracted forward with respect to a direction of traveling of the groove. The signal can be obtained as a sum of signals obtained from the segments of A and D of the four divided detectors.

Figure 8:
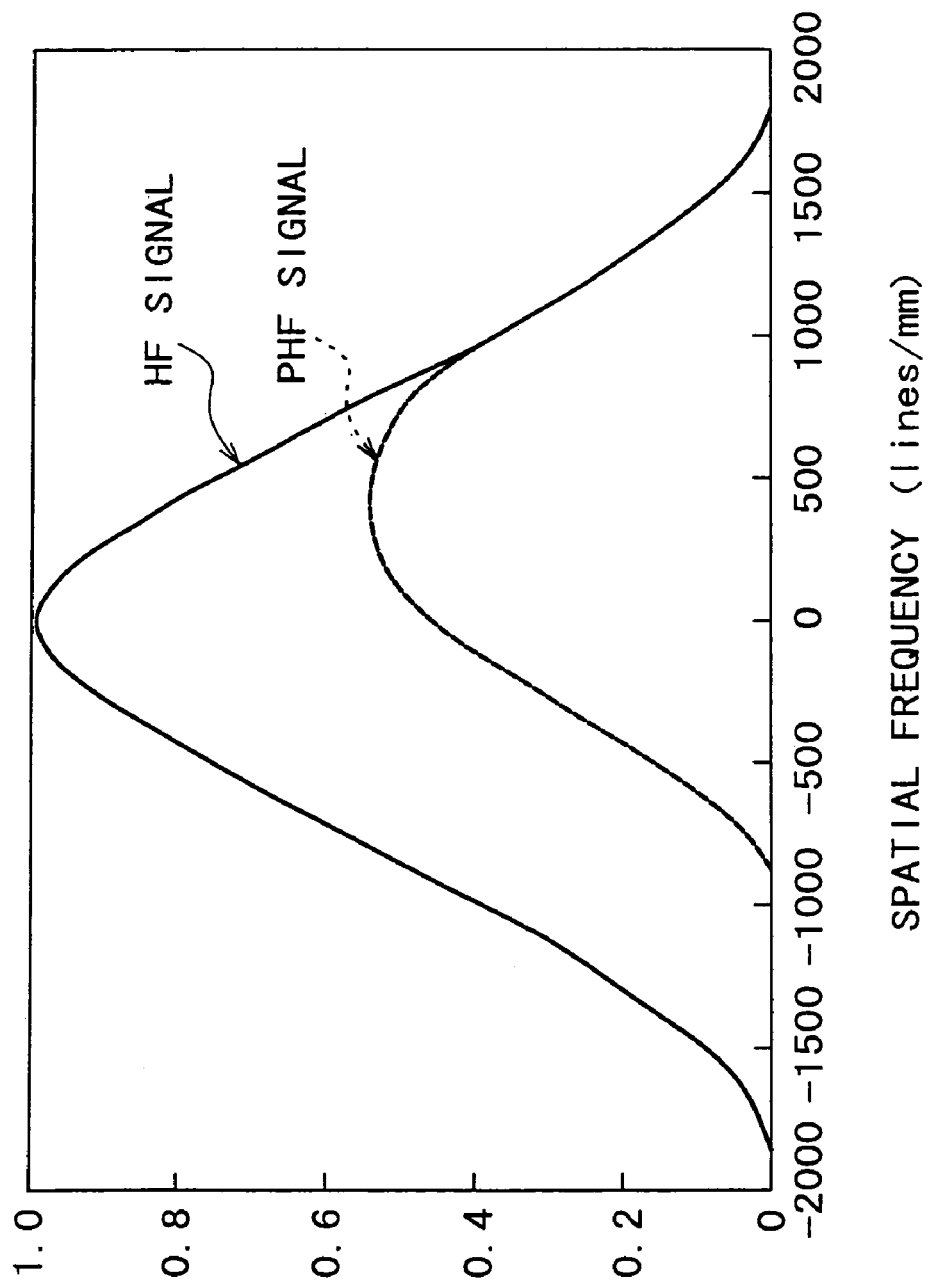
FIG. 8 is a diagram of assistance in explaining frequency characteristics of a plus frequency signal PHF signal obtained by adding together outputs of detectors A and D of the detectors shown in FIG. 7.

FIG. 8 shows an example of frequency characteristics of the signal obtained. In FIG. 8, the axis of ordinates indicates amplitude (gain) of a reproduced signal, and the axis of abscissas indicates spatial frequency.

FIG. 8 shows that the plus frequency signal PHF mainly reflects a signal recorded in a plus frequency region.

Ignoring frequency characteristics of the pickup, the plus frequency signal PHF signal is substantially represented by the following equation (19):

$$PHF \propto Wx \cdot \text{Cos}(2\pi f0 \cdot t) + Wy \cdot \text{Sin}(2\pi f0 \cdot t) \qquad (19)$$

The minus frequency signal NHF is a signal diffracted backward with respect to the direction of traveling of the groove. The signal can be obtained as a sum of the segments of B and C of the four divided detectors.

Figure 9:
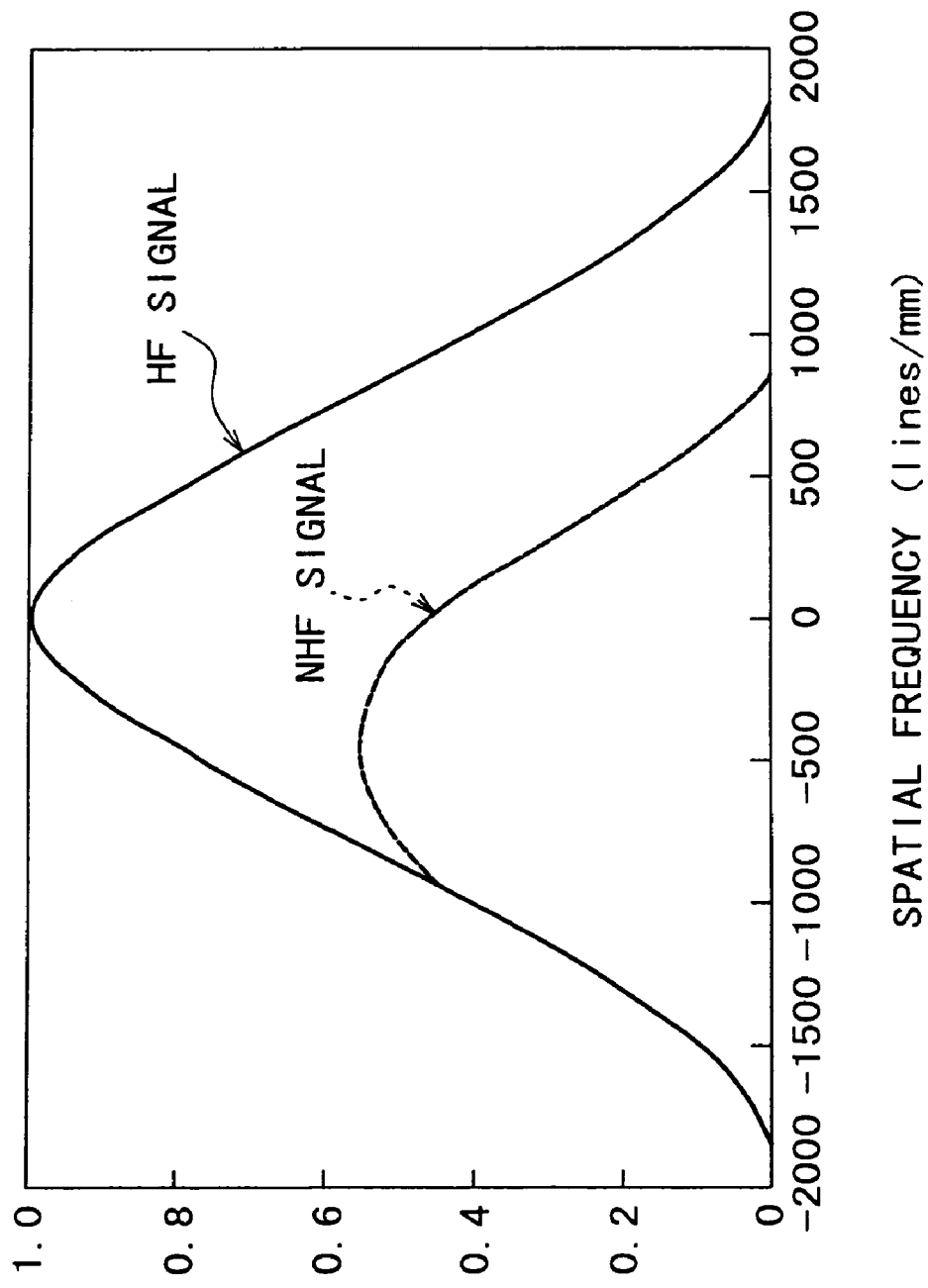
FIG. 9 is a diagram of assistance in explaining frequency characteristics of a minus frequency signal NHF signal obtained by adding together outputs of detectors B and C of the detectors shown in FIG. 7.

FIG. 9 shows an example of frequency characteristics obtained of the minus frequency signal NHF. In FIG. 9, the axis of ordinates indicates amplitude (gain) of a reproduced signal, and the axis of abscissas indicates spatial frequency.

As is clear from FIG. 9, the minus frequency signal NHF mainly reflects a signal recorded in a minus frequency region.

Ignoring frequency characteristics of the pickup, the minus frequency signal NHF signal is substantially represented by the following equation (20):

$$NHF \propto Vx \cdot \text{Cos}(2\pi f0 \cdot t) + Vy \cdot \text{Sin}(2\pi f0 \cdot t) \qquad (20)$$

The plus frequency signal PHF is supplied to the decoding circuit 106A. The minus frequency signal NHF is supplied to the decoding circuit 106B. Since operations in stages succeeding the decoding circuits 106A and 106B are basically the same, only parts related to the decoding circuit 106A will be described in the following, and the decoding circuit 106B and parts for signal processing on an output of the decoding circuit 106B are identified by the same reference numerals to omit their description.

The decoding circuit 106A decodes recorded 2-bit information (b2 and b3) on the basis of the plus frequency signal PHF, and then supplies the 2-bit information (b2 and b3) to a number of bits converting circuit 108A.

The number of bits converting circuit 108A accumulates four pieces of data of 2-bit width from the decoding circuit 106A, and then converts the four pieces of data of the 2-bit width to 8-bit width for output.

The output SF from the number of bits converting circuit 108A is supplied to an ECC circuit 137A. The ECC circuit 137A corrects an error outputted from the decoding circuit 106A on the basis of ECC (Error Correcting Code) added in encoding at the time of recording. Such an error is caused by a defect or the like on the optical disk 2, for example.

A signal thus obtained from an output of the ECC circuit 137A is equal to digital data SA outputted from the recording apparatus. Hence, in a case where the reproduction apparatus is applied to the same use as a compact disk player, for example, the output of the ECC circuit 137A is connected to a DA converter and a speaker to thereby reproduce a musical signal from the speaker.

It is to be noted that according to the present invention, it is possible to reproduce different information recorded in a frequency region on the plus side and a frequency region on the minus side.

Figure 10:
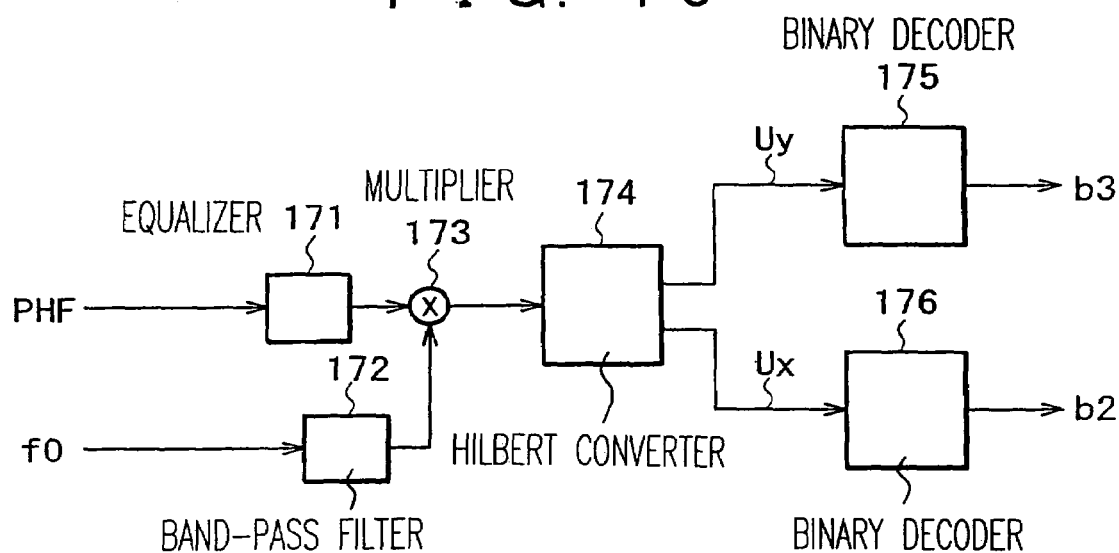
FIG. 10 is a block diagram showing an example of configuration of a decoding circuit in the optical disk reproduction apparatus shown in FIG. 6.
Figure 11:
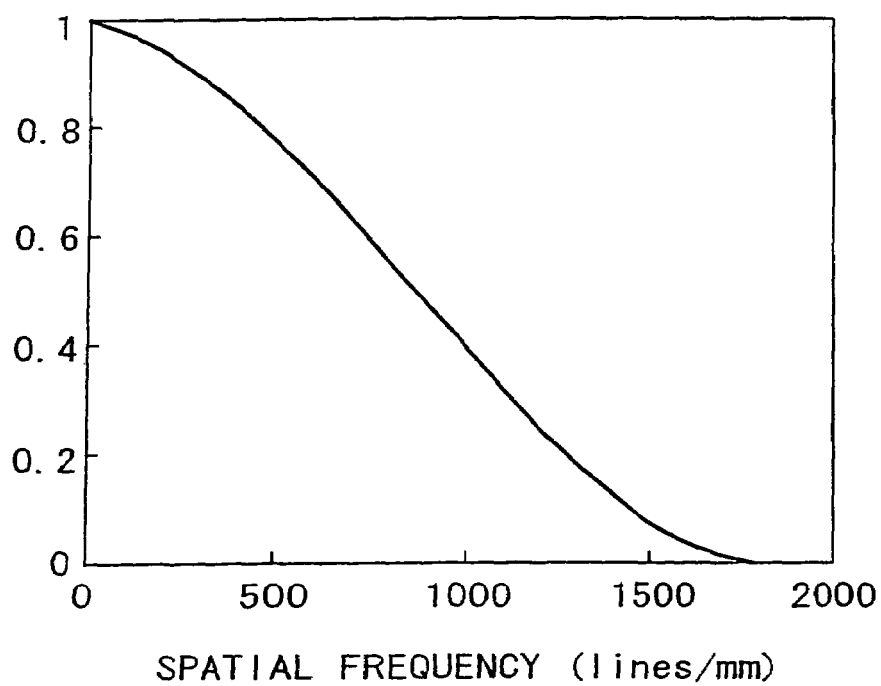
FIG. 11 is a diagram of assistance in explaining an example of spatial frequency characteristics (MTF) in the case of a conventional optical disk.

FIG. 10 is a block diagram showing an internal configuration of the decoding circuit 106A.

The carrier signal f0 in FIG. 10 is connected to a band-pass filter 172 so that only a frequency component around a frequency f0 is extracted and thereby unnecessary harmonic components are removed.

The plus frequency signal PHF is inputted to an equalizer 171. The equalizer 171 mainly corrects frequency characteristics of the optical pickup 107, and then outputs the result. Intersymbol interference caused by the optical pickup 107 can be eliminated substantially completely by using the equalizer 171.

The plus frequency signal PHF corrected by the equalizer 171 and the carrier signal f0 passed through the band-pass filter 172 are multiplied together by a multiplier circuit 173. As a result, a spectrum of the plus frequency signal PHF signal is moved to around a frequency origin.

An output of the multiplier circuit 173 is then inputted to a Hilbert converter 174. The Hilbert converter 174 is formed by an FIR filter or the like. The Hilbert converter 174 separates a real part and an imaginary part from a frequency component of the inputted signal, and then outputs the real part and the imaginary part as Ux and Uy, respectively.

The thus obtained Ux is substantially equal to the band-limited binary wave signal Vx described with reference to FIG. 1. The Uy is substantially equal to the band-limited binary wave signal Vy.

Hence, binary information recorded on the optical disk 2 can be restored by sampling the Ux and Uy in a predetermined cycle T and then comparing the result with a predetermined threshold level.

The outputs Ux and Uy of the Hilbert converter 174 are connected to binary decoding circuits 175 and 176. The binary decoding circuits 175 and 176 compare the inputted signal with a predetermined threshold level, and thereby outputs 1-bit information.

The binary decoding circuits 175 and 176 decode the recorded two-bit information (b2 and b3) on the basis of the thus obtained result of determination, and then output the two-bit information.

The number of bits converting circuit 108A converts a unit number of bits of the thus decoded information to 8 bits, and then outputs the result as data SF of 8-bit width. The ECC circuit 137A removes effects of a defect, a flaw and the like on the disk from the output SF of the number of bits converting circuit 108A, and then outputs the result.

An output signal obtained from the ECC circuit 137A is the same as the digital data SA recorded by the optical disk recording apparatus 1.

It is to be noted that while in the example described above, the synchronizing signal and the like are recorded as a pit train, the present invention is not limited to this, and the synchronizing signal and information such as the address information may be recorded as change in groove depth or wobble of a groove.

In addition, instead of the groove, marks may be used to perform similar recording, as in the case of phase change (PC), magneto-optical (MO), and other optical disks, for example. In this case, recording is performed such that light phase change is given by the marks.

As described above, an optical disk medium according to the present invention is characterized in that digital information is recorded as independent signals of, respectively, a beam reflected or diffracted forward with respect to a direction of traveling of a track and a beam reflected or diffracted backward with respect to the direction of traveling of the track.

Therefore, the optical disk medium expands an effective frequency region to enable higher-density recording than conventional. It is thus possible to realize a medium of higher recording density without the need for an increased NA of the objective lens and a shorter wavelength.

Further, an optical disk reproduction apparatus according to the present invention is characterized by comprising: first decoding means for decoding part of digital information from a beam reflected or diffracted forward with respect to a direction of traveling of a track of an optical disk medium; and second decoding means for decoding part of the digital information from a beam reflected or diffracted backward with respect to the direction of traveling of the track.

Therefore, the optical disk reproduction apparatus can reproduce a disk on which higher-density recording is performed by expanding an effective frequency region into a plus and a minus frequency region. It is thus possible to realize reproduction of a medium on which higher-density recording is performed without the need for an increased NA of the objective lens and a shorter wavelength.

Further, an optical disk reproduction method according to the present invention is characterized by comprising the steps of: decoding part of the digital information from a beam reflected or diffracted forward with respect to a direction of traveling of a track of an optical disk medium; and decoding another part of the digital information from a beam reflected or diffracted backward with respect to the direction of traveling of the track.

Therefore, the optical disk reproduction method can reproduce a disk on which higher-density recording is performed by expanding an effective frequency region into a plus and a minus frequency region. It is thus possible to realize reproduction of a medium on which higher-density recording is performed without the need for an increased NA of the objective lens and a shorter wavelength.

Further, an optical disk recording apparatus according to the present invention is characterized by comprising: complex modulating means for generating a complex modulating signal obtained by separating digital information to be recorded on an optical disk medium into a plus frequency component and a minus frequency component; and laser modulating means for modulating the laser beam on the basis of the complex modulating signal.

Therefore, the optical disk recording apparatus can in effect expand a frequency region by using the plus and minus frequency regions independently, and thus provide an optical disk allowing high-density recording and reproduction. It is thereby possible to realize much higher recording density than conventional without the need for an increased NA of the objective lens and a shorter wavelength.

Further, an optical disk recording method according to the present invention is characterized by comprising the steps of: dividing digital information to be recorded on an optical disk medium into at least two pieces; generating a complex modulating signal by changing a plus frequency component and a minus frequency component according to the pieces of the divided digital information; and recording the digital information on the optical disk medium by modulating the laser beam on the basis of the complex modulating signal.

Therefore, the optical disk recording method can in effect expand a frequency region by using the plus and minus frequency regions independently, and thus provide an optical disk allowing high-density recording and reproduction. It is thereby possible to realize much higher recording density than conventional without the need for an increased NA of the objective lens and a shorter wavelength.

The invention claimed is:

1. An optical disk reading apparatus for reading digital information recorded on a concentric or spiral track formed on an optical disk medium, said optical disk reading apparatus comprising:

a laser beam generating means for generating a laser beam;

optical means for condensing said laser beam received from said laser beam generating means to form a reading light spot on said track of said optical disk medium;

a detector means for detecting different parts of said reading light spot being reflected or diffracted from said track, with one of said different parts being reflected or diffracted in a forward direction and another one of said parts being reflected or diffracted in a rearward direction with respect to a traveling direction of said track;

first decoding means for decoding a part of said digital information from the one of said different parts reflected or diffracted forward with respect to the traveling direction of said track; and second decoding means for decoding another part of said digital information from the another one of said different part reflected or diffracted backward with respect to the traveling direction of said track.

2. An optical disk reading method for reading digital information recorded on a concentric or spiral track formed on an optical disk medium, said optical disk reading method comprising steps of:

generating a laser beam;

condensing said laser beam on said track of said optical disk medium as a reading light spot;

detecting different parts of said reading light spot being reflected or diffracted from said track, with one of said different parts being reflected or diffracted in a forward direction and another one of said parts being reflected or diffracted in a rearward direction with respect to a traveling direction of said track;

decoding a part of said digital information from the one of said different parts reflected or diffracted forward with respect to the traveling direction of said track; and decoding another part of said digital information from the another one of said parts reflected or diffracted backward with respect to the traveling direction of said track.

3. An optical disk reading apparatus for reading digital information recorded on a concentric or spiral track formed on an optical disk medium, said optical disk reading apparatus comprising:

a laser beam generator configured to generate a laser beam;

an optical condenser configured to condense said laser beam received from said laser beam generator to form a reading light spot on said track of said optical disk medium;

a detector configured to detect different parts of said reading light spot being reflected or diffracted from said track, with one of said different parts being reflected or diffracted in a forward direction and another one of said parts being reflected or diffracted in a rearward direction with respect to a traveling direction of said track;

a first decoder configured to decode a part of said digital information from the one of said different parts being reflected or diffracted forward with respect to the traveling direction of said track; and a second decoder configured to decode another part of said digital information from the another one of said different parts being reflected or diffracted backward with respect to the traveling direction of said track.

* * * * *